US007013946B2

(12) United States Patent
Beck et al.

(10) Patent No.: US 7,013,946 B2
(45) Date of Patent: Mar. 21, 2006

(54) ROLLER BLIND, PARTICULARLY WINDOW ROLLER BLIND, FOR MOTOR VEHICLES

(75) Inventors: Gernot Beck, Neckargemünd (DE); Winfried Kubesch, Neckargemünd (DE); Jürgen Lange, Zuzenhausen (DE); Hermann Pauley, Sinsheim (DE)

(73) Assignee: REUM Protec GmbH, Sinsheim (DE)

( * ) Notice: Subject to any disclaimer, the term of this patent is extended or adjusted under 35 U.S.C. 154(b) by 0 days.

(21) Appl. No.: 10/753,843

(22) Filed: Jan. 8, 2004

(65) Prior Publication Data

US 2005/0150617 A1 Jul. 14, 2005

(51) Int. Cl.
*B60J 3/00* (2006.01)

(52) U.S. Cl. ............................ 160/370.22; 160/323.1; 296/141; 296/97.8; 248/266; 242/599.3

(58) Field of Classification Search ............ 242/599.3; 160/24, 370.22, 265, 323.1; 296/97.8, 97.9, 296/97.4, 37.16, 141, 143; 248/269, 267
See application file for complete search history.

(56) References Cited

U.S. PATENT DOCUMENTS

| | | | | |
|---|---|---|---|---|
| 545,371 | A * | 8/1895 | McCapes | 248/269 |
| 5,881,793 | A * | 3/1999 | Righter et al. | 160/323.1 |
| 6,520,239 | B1 * | 2/2003 | Schlecht et al. | 160/120 |
| 6,547,307 | B1 | 4/2003 | Schlecht et al. | |
| 6,796,599 | B1 * | 9/2004 | Schlecht et al. | 296/143 |

* cited by examiner

*Primary Examiner*—Blair M. Johnson

(57) ABSTRACT

The invention relates to a roller blind, particularly a window roller blind, for motor vehicles, with a winding shaft, a mounting arrangement for mounting the winding shaft with variable alignment, a blind which is windable up on the winding shaft, and in the region of each end of the winding shaft a respective spring means arrangeable stationary with respect to the motor vehicle and engaging in the region of the respective winding shaft end for automatic alignment of the winding shaft 6. The mounting arrangement in the region of each spring means has a moveable bearing for moveably mounting the respective winding shaft end in a direction substantially parallel to the pulling direction of the blind.

9 Claims, 4 Drawing Sheets

ROLLER BLIND, PARTICULARLY WINDOW ROLLER BLIND, FOR MOTOR VEHICLES

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a roller blind, particularly window roller blind, for motor vehicles, with a winding shaft, a mounting arrangement for mounting the winding shaft with variable alignment, a blind which can be wound up on the winding shaft, and a respective spring means in the region of each end of the winding shaft, arrangeable relative to the vehicle and engaging in the region of the respective winding shaft end, for automatic alignment of the winding shaft.

2. Prior Art

In motor vehicles, window roller blinds are increasingly built in, in order to protect the vehicle interior from sunlight. These roller blinds are frequently built into the door inner linings or into the rear window region, in the rear storage area. In the pulled-out or darkened state, the blinds of such roller blinds are frequently fastened at two suspension points at the upper end of the pane.

Because of tolerances in manufacture and also in building-in of the roller blind, the roller blind and particularly its winding shaft is frequently not in the exactly correct position for winding up the blind of the roller blind. In particular a deviation of the correct position of the winding shaft within the plane of the pulled-out blind or a plane parallel to this plane is particularly critical, since waves or folds in the pulled-out roller blind arise hereby.

Such waves are disadvantageous since they can impair the life of the blind and thereby also of the whole roller blind and the appearance of the pulled-out blind.

It is therefore known from DE 100 57 762 A1 to provide a compensation device in order to reduce the said wave formation.

FIG. 1 shows schematically such a known compensating device which consists of a fixed bearing 2 arranged about centrally of the winding shaft 1, namely a hinge arranged stationary with respect to the vehicle and also springs 3 arranged at the ends of the winding shaft, and likewise mounted stationary on the motor vehicle. This known compensation device thus permits a pivoting movement of the winding shaft 1 about the axis of the fixed bearing 2 in the direction of the double arrow according to FIG. 1. Because of the pivotability of the winding shaft 1 about the axis of the fixed bearing 2, the winding shaft can perform compensating movements, in order to at least partially reduce waves in the blind.

Since however the winding shaft 1 is not displaceable, at least in the region of the hinge of the fixed bearing 2, waves in the blind due to erroneous assembly or to excessive tolerances cannot be avoided in various configurations.

BRIEF SUMMARY OF THE INVENTION

The invention therefore has as its object to provide a motor vehicle roller blind with an improved compensation device.

This object is attained by the invention with a roller blind of the kind mentioned at the beginning in that the bearing arrangement in the region of each spring means has a respective moveable bearing, moveable in a direction substantially parallel to the direction in which the blind is pulled, for moveable mounting of the respective winding shaft end.

Due to the construction of the bearing arrangement according to the invention, no fixed bearing is provided, particularly not between the two winding shaft ends and thus in the region of the moveable bearing. Rather, the moveable bearings arranged at both sides of the winding shaft permit a variable alignment of the winding shaft in a plane substantially parallel to the plane of the pulled-out blind. Thus each point of the winding shaft is displaceable at least in the pulling direction of the blind or parallel to this direction. High flexibility and resilience of the winding shaft are hereby attained so that in the preponderant number of cases of deviations of the winding shaft from a correct position due to erroneous building-in or due to tolerances, transverse stresses in the blind and thereby waves or folds in the blind can be avoided.

Expensive manual adjusting work, particularly releasing the door inner lining for adjusting the winding shaft, can be avoided with a motor vehicle roller blind according to the invention, since the alignment of the winding shaft takes place automatically due to the moveable bearing and the spring elements.

Furthermore, the mounting arrangements for the winding shaft has substantially only two connection points to the motor vehicle body, namely in the region of the ends of the winding shaft. The risk of noises due to stresses in the roller blind construction due to a static over-determination due to, for example, three or more connection points, is reduced. Furthermore, due to only two connection points, the constructional cost of building the roller blind into the motor vehicle is also reduced.

BRIEF DESCRIPTION OF THE DRAWINGS

Further advantages and preferred embodiments are given by the embodiment examples described in detail using the accompanying drawings.

DETAILED DESCRIPTION OF THE INVENTION

Figure 2:
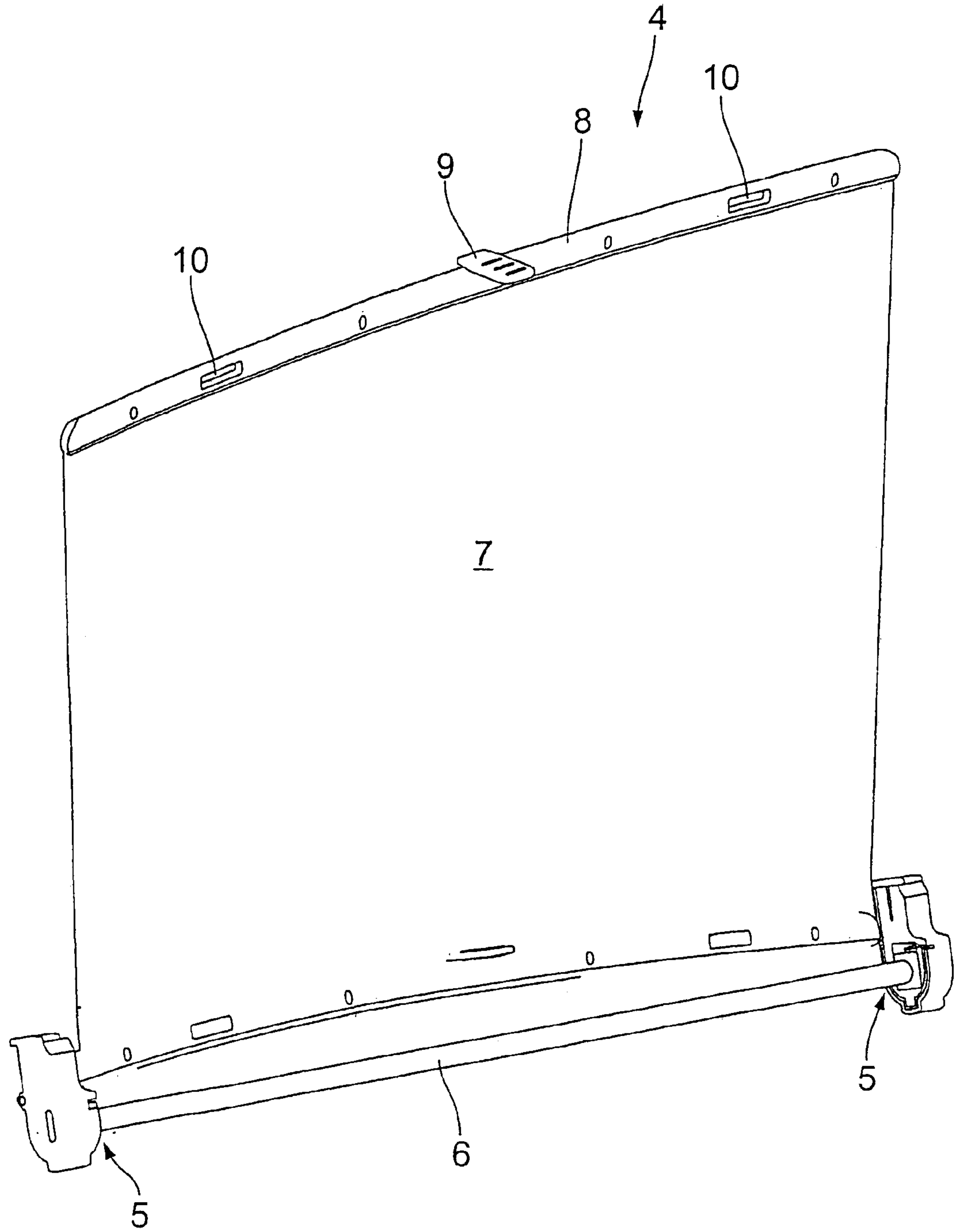
FIG. 2 shows a window roller blind for a motor vehicle according to an embodiment example of the present invention.

FIG. 2 shows an embodiment example of a window roller blind for motor vehicles, in a pulled-out state.

The roller blind has a mounting arrangement 5 for mounting a winding shaft 6 on which a blind 7 can be wound, for example, with a spring motor fitted in the winding shaft 6. An (upper) end of the blind 7 is closed by a pull rod 8, which has a handle 9 mounted substantially in the middle of the pull rod 8. The pull rod 8 has two fastening means in the form of apertures 10 which can be engaged with receiving elements, for example, hooks, fitted in the region of the window frame, so that the roller blind can remain in the pulled-out state.

The end of the blind 7 opposite the pull rod 8 is fastened to the winding shaft 6.

The roller blind 4 shown in FIG. 2 shows that the pull rod 8 does not necessarily have to run parallel to the winding shaft 6, but that the pull rod 8 can also assume an angle to the winding shaft 6. Such a construction is frequently used in motor vehicle side window roller blinds, since the upper and lower edges of the window opening are frequently not mutually parallel with the side windows. In particular, the pull rod 8 is matched to the course of the upper edge of the window opening, and particularly is curved, in order to prevent or avoid any gaps when the window opening is covered by the motor vehicle roller blind 4.

In FIG. 2, the roller blind is shown in the substantially completely pulled-out state. Furthermore, the state of the roller blind with pulled-in blind 7 is shown, in that the pull rod 6 is sketched incompletely in a lower position.

The mounting arrangement 5 is mounted in the inner or side lining of a door or sidewall of the motor vehicle, a slot being provided on the lining in order for the pull rod 8, handle 9 and blind 7 to be passed through.

Figure 3:
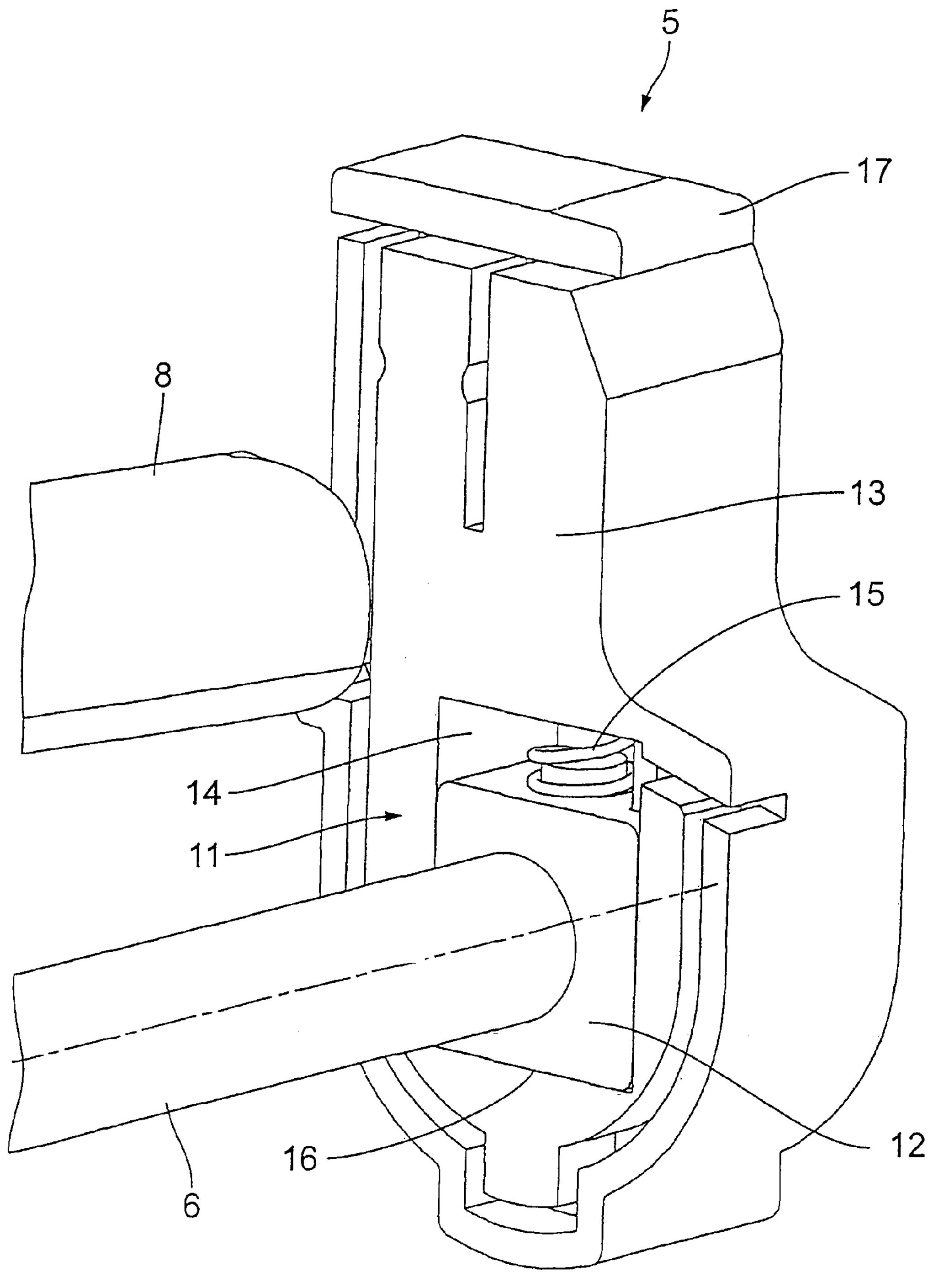
FIG. 3 shows an enlarged excerpt of FIG. 2 in the region of the right-hand end of the winding shaft.

FIG. 3 shows the right-hand side portion of the mounting arrangement 5 of FIG. 2 on an enlarged scale. The mounting arrangement 5 has a moveable bearing 11 in the form of a slide bearing, arranged in the region of the right-hand side end of the winding shaft 6. The moveable bearing 11 has a retaining element 12 with a bore to receive the axis of the winding shaft 6. The retaining element 12 is installed in a base body 13 of the moveable bearing, such that the retaining element 12 is moveable parallel to the direction in which the blind or the pull rod 8 is moveable. The moveable bearing 11 thus has a degree of freedom which permits a movement of the winding shaft in a direction substantially parallel to the direction in which the blind 6 is pulled. The moveable bearing is constructed such that movements in other directions, namely in a direction parallel to the winding shaft 6 or in a direction perpendicular to the plane of the pulled-out blind 7, are prevented.

For this purpose, the holding element 12 runs in a recess 14, formed with parallel walls, in the base body 13. The holding element 12 is prestressed into a lower end position by a spring 15. The spring 15 engages on the one hand on the retaining element 12, and thus in the region of the right-hand side winding shaft end and on the other hand on an (upper) end of the recess 14, so that the retaining element 12 is pressed at the opposite end, namely the stop 16 of the recess 14. The winding shaft 6 is moveably mounted in the moveable bearing base body 13 in this manner.

The moveable bearing base body 13 is provided with a cover 17, in order to integrate the roller blind with the inner lining.

In FIG. 3, the pull rod 8 is furthermore shown and in fact in its lower end position, i.e. in the wound-up state of the blind, which, however, is not shown for the sake of clarity.

Figure 4:
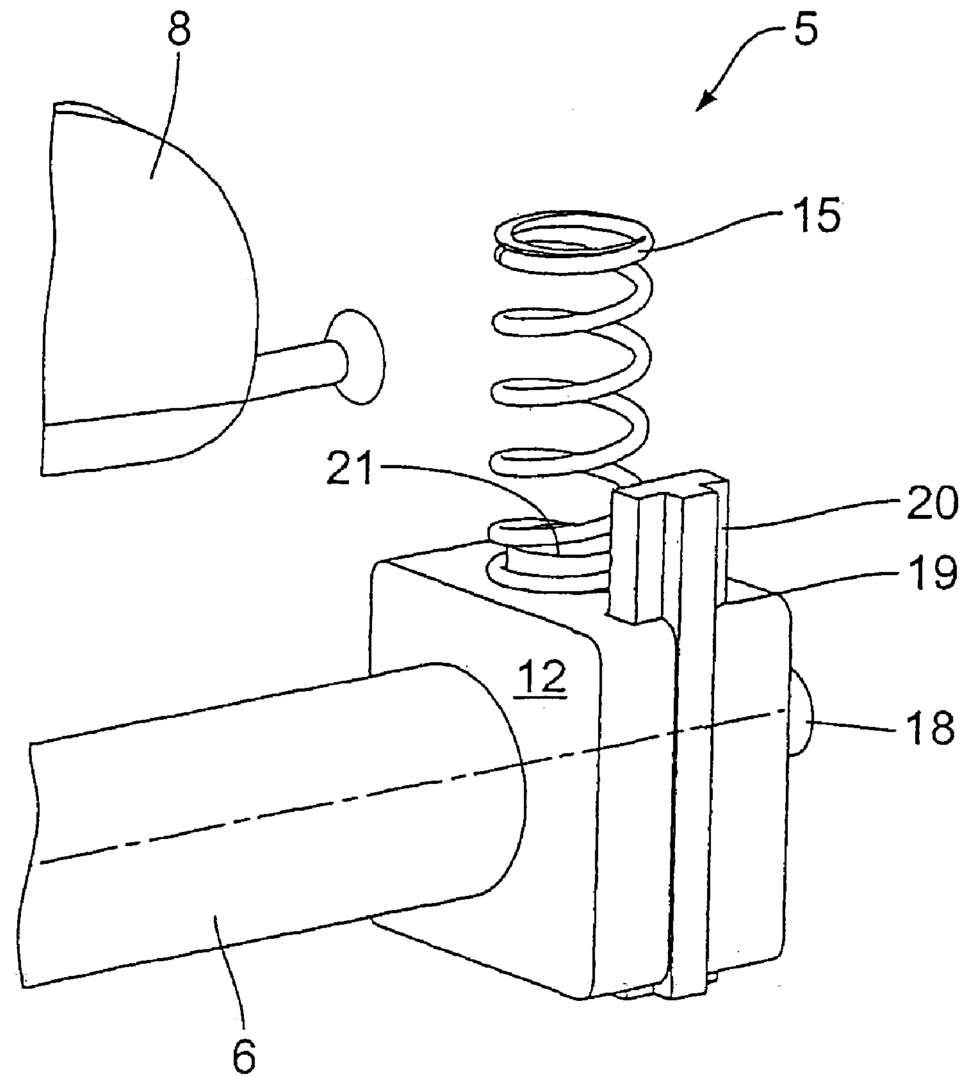
FIG. 4 shows a portion of the elements shown in FIG. 3.

FIG. 4 shows the mounting arrangement 5 of FIG. 3, however without the moveable bearing base body and without the cover 17.

The retaining element 12 is penetrated by the axis 18 of the winding shaft 6 in the region of the above-mentioned bore. The retaining element 12 furthermore has a guide device 19 in the form of a groove, which extends along the retaining element 12, and in fact in a direction substantially parallel to the pulling direction of the blind.

The guide device or groove 19 is an engagement with a guide member in the form of a rail 20, which likewise extends in a direction parallel to the pulling direction of the blind. The spring 15 rests in a receiving device in the form of a pin 21 on the retaining element 12 and also in a receiving device (not shown) on the base body 13.

At the opposite end of the winding shaft 6 is located a moveable bearing, formed mirror-image-wise of the mid-plane of the winding shaft, according to the means described hereinabove.

In fact, both moveable bearings are substantially only axially displaceable, and in fact in a direction parallel to the pulling direction of the blind. However, because both retaining elements must not be moved exclusively simultaneously and in the same manner, the axis 18 is arranged hinged in the retaining element. It is possible in this manner that the axis can be pivoted to a predetermined degree about the alignment shown.

Figure 5:
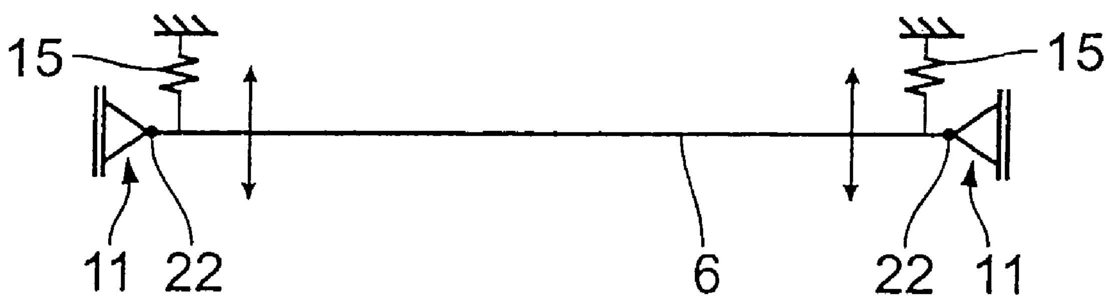
FIG. 5 shows a schematic diagram of a winding shaft for a motor vehicle roller blind with a mounting arrangement according to an embodiment example of the invention.

FIG. 5 illustrates this situation in a schematic diagram. A respective moveable bearing 11 is shown at both ends of the winding shaft 6, and, as indicated by the double arrows, is displaceable upward or downward. Each moveable bearing has a hinge 22 about which, as stated above, the winding shaft 6 is mounted pivotably within predetermined limits. In the region of both ends of the winding shaft 6, the respective above-described springs 15 engage. These two springs 15 are preferably formed as compression springs, which press the winding shaft 6 against its pulling direction, onto the respective stop 16. Alternatively or additionally, the spring(s) 15 is/are mounted on the other side of the winding shaft 16 and formed as tension springs, in order likewise to press the winding shaft onto the stop 16.

The spring 15 is shown as a spiral spring in the previous embodiment example. Alternatively or additionally, however, other spring means can also be provided, for example, leaf springs or else elastic bodies having the same effect.

The present invention is not limited to motor vehicle roller blinds or side windows, but is also used with rear window roller blinds and also with roller blinds for screening sun roofs, i.e. window surfaces in the region of the vehicle roof. Furthermore the invention can also be used for roller blinds as freight space covering. The blind of the respective roller blind can therefore be made transparent or else light-impermeable, in particular opaque.

Figure 1:
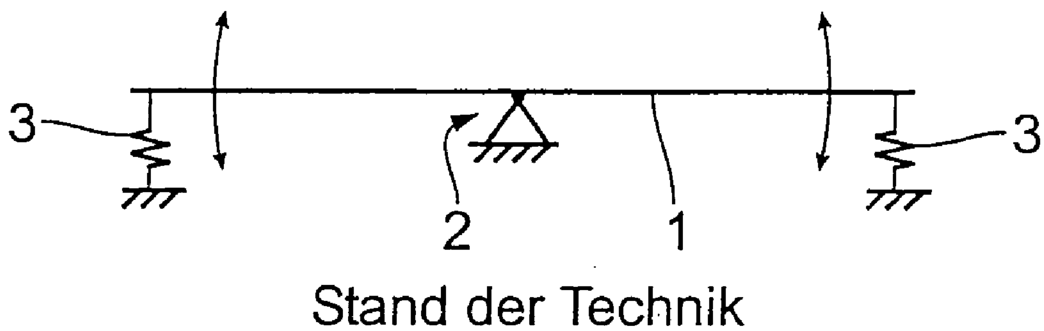
FIG. 1 shows a schematic diagram of a winding shaft for a motor vehicle roller blind with a mounting arrangement according to the state of the art.

Comparison of FIG. 5 and FIG. 1 which shows the state of the art, shows that in the roller blind according to the invention each point of the winding shaft is displaceable substantially parallel to the pulling direction of the blind. In contrast to this, in the known roller blind according to FIG. 1, the winding shaft 1 is not displaceable in the middle, since a fixed bearing 2 is provided there. In this manner, the invention attains a higher flexibility and resilience of the winding shaft 6, so that transverse stresses, and thereby waves or folds, in the blind can be avoided as far as possible.

The invention claimed is:

1. A roller blind for motor vehicles, comprising a winding shaft (6), a mounting arrangement (5) for mounting the winding shaft (6) with variable alignment, a blind (7) that is windable on the winding shaft (6), and in a region of each end of the winding shaft (6), a respective spring means (15), arrangeable stationary relative to the motor vehicle, wherein the mounting arrangement (5) has, in a region of each spring means (15), a respective moveable bearing (11) mounted for movement in a direction substantially parallel to a pulling direction of the blind (7), for moveable mounting of the respective winding shaft end, the spring means engaging a respective movable bearing for automatic alignment of the winding shaft (6), and wherein each moveable bearing (11) comprises a retaining element (12) with a bore for receiving respective ends of the winding shaft (6) and a guide device (19) that is displaceably engaged with a guide member (20) arrangeable stationary of the motor vehicle, in a direction substantially parallel to the pulling direction of the blind (7).

2. The roller blind according to claim 1, wherein the guide member (20) comprises a substantially elongate rail.

3. The roller blind according to claim 1, wherein the guide device (19) comprises a groove extending substantially parallel of the guide member (20).

4. The roller blind according to claim 1, wherein the retaining element (12) has a receiving device (21) for receiving a first end of a spring means (15).

5. The roller blind according to claim 1, wherein each moveable bearing (11) comprises a base body (13) that is fixably stationary on the motor vehicle and on which the guide member (20) is mounted.

6. The roller blind according to claim 5, wherein the base body (13) comprises a receiving device (21) for receiving a second end of the spring means (15).

7. The roller blind according to claim 1, wherein each spring means (15) comprises a spiral spring.

8. The roller blind according to claim 1, wherein each spring means (15) presses a respective retaining element with an opened roller blind (4) onto a stop (16) on a respective base body (13) substantially against a direction parallel to a pulling direction of the blind (7).

9. The roller blind according to claim 1, wherein each spring means (15) holds a respective retaining element (12) with the roller blind (4) closed, at a spacing from a respective stop (16), the distance being determined by a spring stress of the respective spring means (15) and a tension in the blind (7) in a pulling direction of the blind (7).

* * * * *